United States Patent
Ohashi et al.

(10) Patent No.: US 12,203,542 B2
(45) Date of Patent: Jan. 21, 2025

(54) INFORMATION PROCESSING DEVICE, NON-TRANSITORY STORAGE MEDIUM, AND INFORMATION PROCESSING METHOD

(71) Applicants: TOYOTA JIDOSHA KABUSHIKI KAISHA, Toyota (JP); J-QuAD DYNAMICS Inc., Tokyo (JP); ADVICS CO., LTD., Kariya (JP)

(72) Inventors: Yuta Ohashi, Toyota (JP); Yusuke Kamiya, Toyota (JP); Masumi Dakemoto, Nagoya (JP); Atsushi Kuchinomachi, Tokyo (JP); Tatsuya Hiromura, Tokyo (JP)

(73) Assignees: TOYOTA JIDOSHA KABUSHIKI KAISHA, Toyota (JP); J-QUAD DYNAMICS INC., Tokyo (JP); ADVICS CO., LTD., Kariya (JP)

( * ) Notice: Subject to any disclaimer, the term of this patent is extended or adjusted under 35 U.S.C. 154(b) by 0 days.

(21) Appl. No.: 18/593,354

(22) Filed: Mar. 1, 2024

(65) Prior Publication Data

US 2024/0301947 A1    Sep. 12, 2024

(30) Foreign Application Priority Data

Mar. 6, 2023 (JP) .................. 2023-033619

(51) Int. Cl.
*F16H 61/02* (2006.01)
*F16H 61/00* (2006.01)

(52) U.S. Cl.
CPC . *F16H 61/0204* (2013.01); *F16H 2061/0081* (2013.01)

(58) Field of Classification Search
CPC ......... F16H 61/0204; F16H 2061/0081; F16H 2061/0241; F16H 61/16; F16H 2061/161; F16H 2061/163; B60W 50/087; B60W 50/10; B60W 50/12; B60W 10/10; B60W 10/11
USPC ......................................... 701/51, 57, 64, 62
See application file for complete search history.

(56) References Cited

U.S. PATENT DOCUMENTS

| 2011/0066344 | A1* | 3/2011 | Niwa | B60W 10/184 701/70 |
| 2013/0151097 | A1* | 6/2013 | Deurloo | F16H 61/16 701/62 |
| 2015/0274162 | A1* | 10/2015 | Sato | B60W 30/16 701/1 |
| 2020/0070849 | A1  | 3/2020 | Suzuki et al. | |

(Continued)

FOREIGN PATENT DOCUMENTS

JP    2020-032894 A    3/2020

*Primary Examiner* — Roger L Pang
(74) *Attorney, Agent, or Firm* — Oliff PLC

(57) ABSTRACT

An information processing method includes receiving shift requests to control a shift range of a vehicle from a plurality of application software products configured to implement driver assistance functions of the vehicle, arbitrating the shift requests by using, as a condition, whether each of the received shift requests is a request in a traveling range or a request in a parking range, when the traveling range is the shift range in which a driving wheel of the vehicle is rotatable and the parking range is the shift range in which the driving wheel is not rotatable, and generating an instruction value for an action request to drive an actuator based on a result of arbitration.

6 Claims, 4 Drawing Sheets

(56) References Cited

U.S. PATENT DOCUMENTS

2021/0237748 A1* 8/2021 Dakemoto .......... B60W 10/184
2024/0075935 A1* 3/2024 Saleem ................ B60N 2/0025

* cited by examiner

INFORMATION PROCESSING DEVICE, NON-TRANSITORY STORAGE MEDIUM, AND INFORMATION PROCESSING METHOD

CROSS-REFERENCE TO RELATED APPLICATION

This application claims priority to Japanese Patent Application No. 2023-033619 filed on Mar. 6, 2023, incorporated herein by reference in its entirety.

BACKGROUND

1. Technical Field

The present disclosure relates to an information processing device, a non-transitory storage medium, and an information processing method.

2. Description of Related Art

An information processing device of Japanese Unexamined Patent Application Publication No. 2020-032894 (JP 2020-032894 A) receives motion requests from a plurality of application software products that implements driver assistance functions of a vehicle. The information processing device arbitrates the received motion requests. The information processing device generates an instruction value for an action request to drive an actuator based on an arbitration result.

SUMMARY

The information processing device as disclosed in JP 2020-032894 A receives, from each application software product, a shift request to control a shift range of the vehicle as one of the motion requests associated with the application software product. When arbitrating a plurality of shift requests, the information processing device of JP 2020-032894 A selects, as the arbitration result, a shift request received first from among those that are still being received. Therefore, the information processing device of JP 2020-032894 A has a possibility that, when a plurality of shift requests is received, for example, a shift request received later is not fulfilled even if the shift request received later should be fulfilled.

A first aspect of the present disclosure relates to an information processing device. The information processing device includes a processor. The processor is configured to receive shift requests to control a shift range of a vehicle from a plurality of application software products configured to implement driver assistance functions of the vehicle, arbitrate the shift requests by using, as a condition, whether each of the received shift requests is a request in a traveling range or a request in a parking range, when the traveling range is the shift range in which a driving wheel of the vehicle is rotatable and the parking range is the shift range in which the driving wheel is not rotatable, and generate an instruction value for an action request to drive an actuator based on a result of arbitration.

In the first aspect, the processor may be configured to receive priority levels in association with the shift requests when receiving the shift requests. The priority levels may be determined individually for the application software products that are sources of the shift requests. The processor may be configured to arbitrate the shift requests by using, as a condition, the priority levels associated with the received shift requests, and whether each of the received shift requests is the request in the traveling range or the request in the parking range.

In the first aspect, the processor may be configured to, when the priority level associated with the received request in the traveling range and the priority level associated with the received request in the parking range are the same, select the request in the parking range as a result of arbitration of the shift requests when the priority level associated with the received request in the traveling range and the priority level associated with the received request in the parking range are the same.

In the first aspect, the processor may be configured to determine, as a representative of the request in the traveling range, a request in the traveling range that is received first among requests in the traveling range that are received continuously. The processor may be configured to arbitrate the shift requests by using, as a candidate, the request in the traveling range that is determined as the representative.

A second aspect of the present disclosure relates to a non-transitory storage medium storing instructions that are executable by one or more processors of an information processing device and that cause the one or more processors to perform functions. The functions include receiving shift requests to control a shift range of a vehicle from a plurality of application software products configured to implement driver assistance functions of the vehicle, arbitrating the shift requests by using, as a condition, whether each of the received shift requests is a request in a traveling range or a request in a parking range, when the traveling range is the shift range in which a driving wheel of the vehicle is rotatable and the parking range is the shift range in which the driving wheel is not rotatable, and generating an instruction value for an action request to drive an actuator based on a result of arbitration.

A third aspect of the present disclosure relates to an information processing method to be executed by an information processing device. The information processing method includes receiving shift requests to control a shift range of a vehicle from a plurality of application software products configured to implement driver assistance functions of the vehicle, arbitrating the shift requests by using, as a condition, whether each of the received shift requests is a request in a traveling range or a request in a parking range, when the traveling range is the shift range in which a driving wheel of the vehicle is rotatable and the parking range is the shift range in which the driving wheel is not rotatable, and generating an instruction value for an action request to drive an actuator based on a result of arbitration.

According to the first aspect, the second aspect, and the third aspect of the present disclosure, the shift requests are arbitrated in consideration of whether the received shift request is the request in the traveling range or the request in the parking range. Therefore, for example, when the request in the traveling range is received first as the shift request and the request in the parking range is received as the shift request afterward, the parking range may be selected by the arbitration. With the above configuration, it is possible to fulfill the shift request having priority when a plurality of shift requests is received.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Schematic Configuration of Vehicle

An embodiment of the present disclosure will be described below with reference to FIGS. 1 to 4. First, a schematic configuration of a vehicle 100 will be described.

Figure 1:
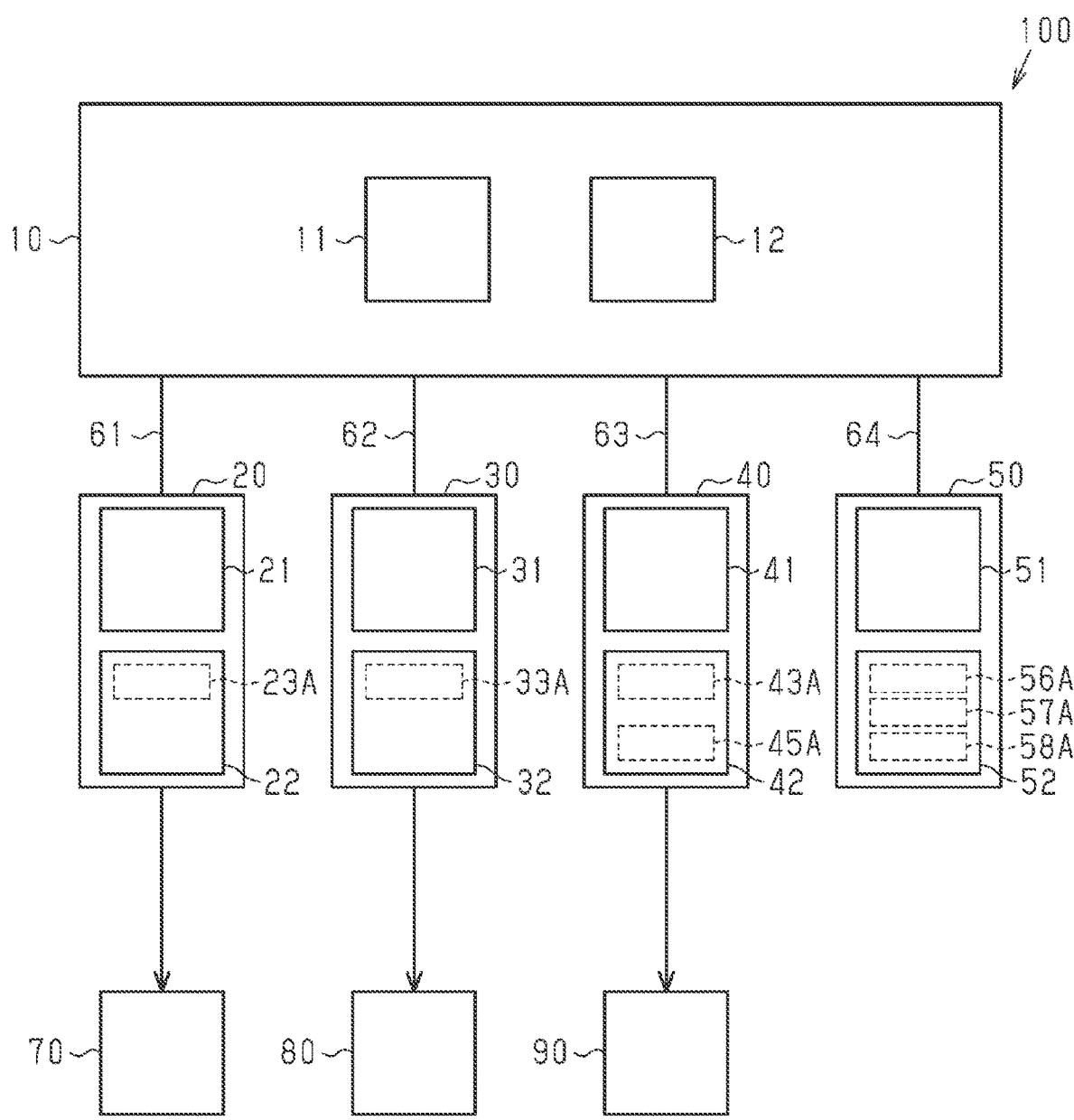
FIG. 1 is a schematic configuration diagram of a vehicle.

As shown in FIG. 1, the vehicle 100 includes an engine 70, a transmission 80, and a brake device 90. The engine 70 is a drive source for the vehicle 100. Therefore, the engine 70 can apply a driving force to driving wheels of the vehicle 100 via the transmission 80. The engine 70 includes a throttle valve, fuel injection valves, ignition devices, and the like (not shown).

Examples of the transmission 80 include a stepped automatic transmission including a plurality of clutches, a plurality of friction engagement elements, and a plurality of planetary gear mechanisms. The shift range of the transmission 80 can be changed by operating the clutches and the friction engagement elements (not shown). The shift range of the transmission 80 includes "parking", "neutral", "drive", and "reverse".

The brake device 90 generates a braking force for the vehicle 100. The brake device 90 is a so-called mechanical brake device that mechanically brakes the driving wheels of the vehicle 100. Examples of the brake device 90 include a disc brake.

As shown in FIG. 1, the vehicle 100 includes a central electronic control unit (ECU) 10, an engine ECU 20, a transmission ECU 30, a brake ECU 40, and an advanced driver assistance ECU 50. The vehicle 100 also includes a first external bus 61, a second external bus 62, a third external bus 63, and a fourth external bus 64.

The central ECU 10 centrally controls the vehicle 100 as a whole. The central ECU 10 includes a central processing unit (CPU) 11 and a storage device 12. The storage device 12 prestores various programs and various types of data. The storage device 12 includes a read only memory (ROM), a random access memory (RAM), and a storage. The CPU 11 implements various processes by executing the programs stored in the storage device 12.

The engine ECU 20 is connected to the central ECU 10 via the first external bus 61. Therefore, the engine ECU 20 can communicate with the central ECU 10. The engine ECU 20 controls the engine 70 by outputting a control signal to the engine 70. The engine ECU 20 includes a CPU 21 and a storage device 22. The storage device 22 prestores various programs and various types of data. The storage device 22 prestores an engine application 23A as one of the various programs. The engine application 23A is application software for controlling the engine 70. The storage device 22 includes a ROM, a RAM, and a storage. The CPU 21 implements a function as an engine control unit 23 described later by executing the engine application 23A stored in the storage device 22.

The transmission ECU 30 is connected to the central ECU 10 via the second external bus 62. Therefore, the transmission ECU 30 can communicate with the central ECU 10. The transmission ECU 30 controls the transmission 80 by outputting a control signal to the transmission 80. The transmission ECU 30 includes a CPU 31 and a storage device 32. The storage device 32 prestores various programs and various types of data. The storage device 32 prestores a transmission application 33A as one of the various programs. The transmission application 33A is application software for controlling the transmission 80. The storage device 32 includes a ROM, a RAM, and a storage. The CPU 31 implements a function as a transmission control unit 33 described later by executing the transmission application 33A stored in the storage device 32.

The brake ECU 40 is connected to the central ECU 10 via the third external bus 63. Therefore, the brake ECU 40 can communicate with the central ECU 10. The brake ECU 40 controls the brake device 90 by outputting a control signal to the brake device 90. The brake ECU 40 includes a CPU 41 and a storage device 42. The storage device 42 prestores various programs and various types of data. The storage device 42 prestores a brake application 43A as one of the various programs. The brake application 43A is application software for controlling the brake device 90. The storage device 42 further prestores a motion manager application 45A as one of the various programs. The motion manager application 45A is application software for arbitrating a plurality of motion requests. The storage device 42 includes a ROM, a RAM, and a storage. The CPU 41 implements a function as a brake control unit 43 described later by executing the brake application 43A stored in the storage device 42. The CPU 41 implements a function as a motion manager 45 described later by executing the motion manager application 45A stored in the storage device 42. In the present embodiment, the brake ECU 40 is an example of an information processing device. The motion manager application 45A is an example of an information processing program. A series of methods implemented by the brake ECU 40 executing the motion manager application 45A is an example of an information processing method.

The advanced driver assistance ECU 50 is connected to the central ECU 10 via the fourth external bus 64. Therefore, the advanced driver assistance ECU 50 can communicate with the central ECU 10. The advanced driver assistance ECU 50 executes various types of driver assistance. The advanced driver assistance ECU 50 includes a CPU 51 and a storage device 52. The storage device 52 prestores various programs and various types of data. The various programs include a first assistance application 56A, a second assistance application 57A, and a third assistance application 58A. Examples of the first assistance application 56A include application software for collision damage reduction braking, that is, so-called autonomous emergency braking (AEB) that automatically applies braking in order to reduce damage of a collision to the vehicle 100. Examples of the second assistance application 57A include application software for so-called lane keeping assist (LKA) that keeps a lane where the vehicle 100 is traveling. Examples of the third assistance application 58A include application software for so-called adaptive cruise control (ACC) that allows the vehicle 100 to follow a preceding vehicle traveling ahead of the vehicle 100 while keeping a constant inter-vehicle distance. In the present embodiment, the first assistance application 56A, the second assistance application 57A, and the third assistance application 58A are each application software for implementing driver assistance functions of the vehicle 100. The storage device 52 includes a ROM, a RAM, and a storage. The CPU 51 implements a function as a first assistance unit 56 described later by executing the first assistance application 56A stored in the storage device 52.

The CPU 51 implements a function as a second assistance unit 57 described later by executing the second assistance application 57A stored in the storage device 52. The CPU 51 implements a function as a third assistance unit 58 described later by executing the third assistance application 58A stored in the storage device 52.

Basic Configuration Related to Motion Manager

Figure 2:
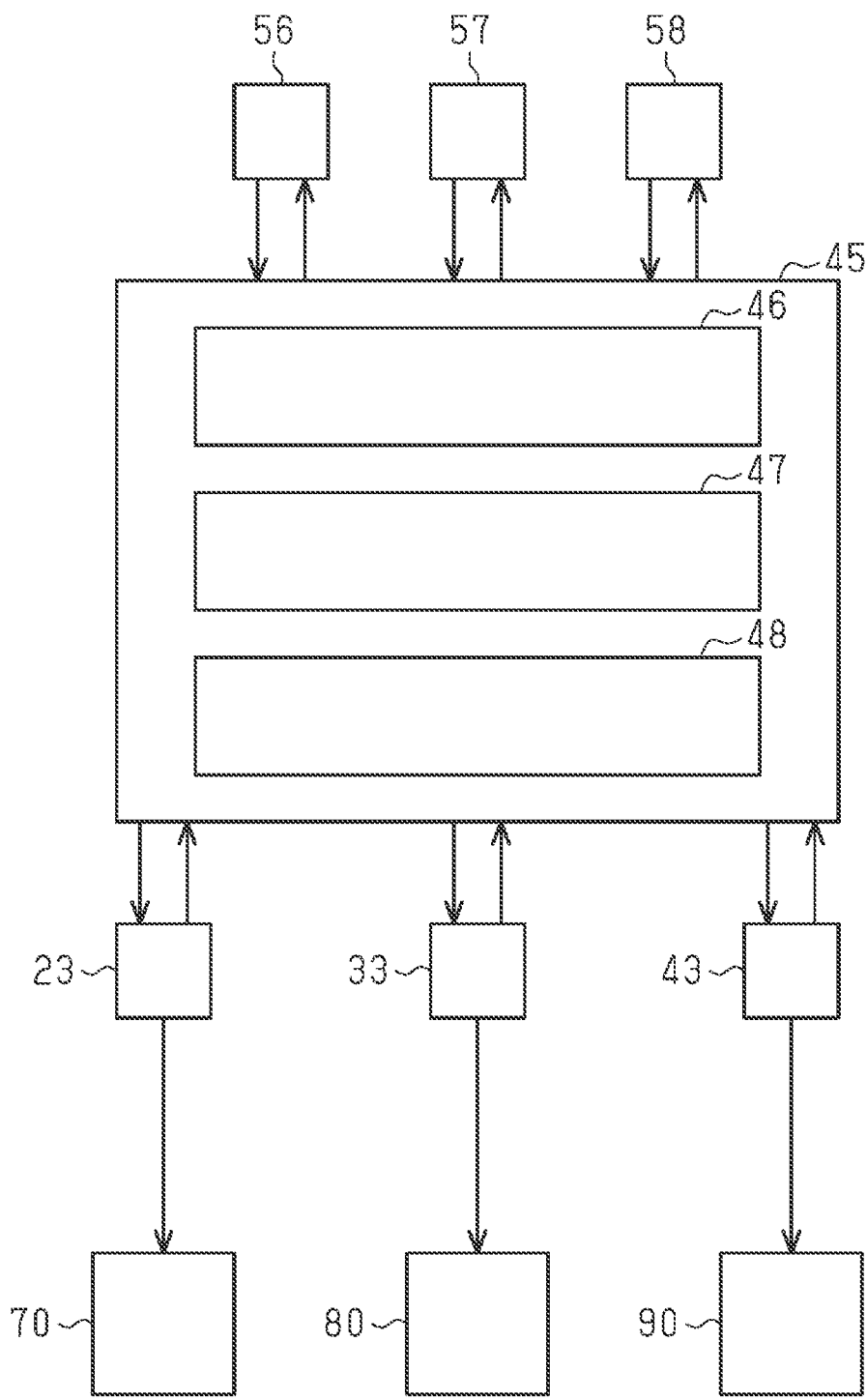
FIG. 2 is a functional block diagram showing a basic configuration of a motion manager.

Next, a basic configuration related to the motion manager 45 will be described with reference to FIG. 2. As illustrated in FIG. 2, the motion manager 45 can communicate with the first assistance unit 56, the second assistance unit 57, and the third assistance unit 58. The motion manager 45 can communicate with the engine control unit 23, the transmission control unit 33, and the brake control unit 43.

The first assistance unit 56, the second assistance unit 57, and the third assistance unit 58 output motion requests to the motion manager 45 when executing various types of control. At this time, the first assistance unit 56, the second assistance unit 57, and the third assistance unit 58 continue to output the motion requests, for example, from the time when the various types of control become necessary to the time when such control is not needed any more. The motion request includes, for example, an acceleration request value for controlling a longitudinal acceleration of the vehicle 100, and a shift request SR that is a request value for controlling the shift range of the transmission 80 in the vehicle 100.

As shown in FIG. 2, the motion manager 45 includes a reception unit 46, an arbitration unit 47, and a generation unit 48. The reception unit 46 of the motion manager 45 receives the motion requests from the first assistance unit 56, the second assistance unit 57, and the third assistance unit 58. Therefore, the reception unit 46 of the motion manager 45 may receive a plurality of motion requests simultaneously. In the present embodiment, the reception of the motion requests from the first assistance unit 56, the second assistance unit 57, and the third assistance unit 58 corresponds to reception of motion requests from the application software products that implement the driver assistance functions of the vehicle 100. The arbitration unit 47 of the motion manager 45 arbitrates the received motion requests. The generation unit 48 of the motion manager 45 generates instruction values for action requests to control various actuators based on an arbitration result. The various actuators include the engine 70, the transmission 80, the brake device 90, and the like. When controlling, for example, the engine 70, the motion manager 45 outputs an instruction value for an action request to the engine control unit 23. The engine control unit 23 outputs a control signal to the engine 70 based on the instruction value for the action request. When controlling, for example, the transmission 80, the motion manager 45 outputs an instruction value for an action request to the transmission control unit 33. The transmission control unit 33 outputs a control signal to the transmission 80 based on the instruction value for the action request. When controlling, for example, the brake device 90, the motion manager 45 outputs an instruction value for an action request to the brake control unit 43. The brake control unit 43 outputs a control signal to the brake device 90 based on the instruction value for the action request.

Shift Arbitration Control

Next, shift arbitration control to be executed by the motion manager 45 will be described with reference to FIGS. 3 and 4. The motion manager 45 repeats the shift arbitration control in each predetermined control cycle.

Figure 3:
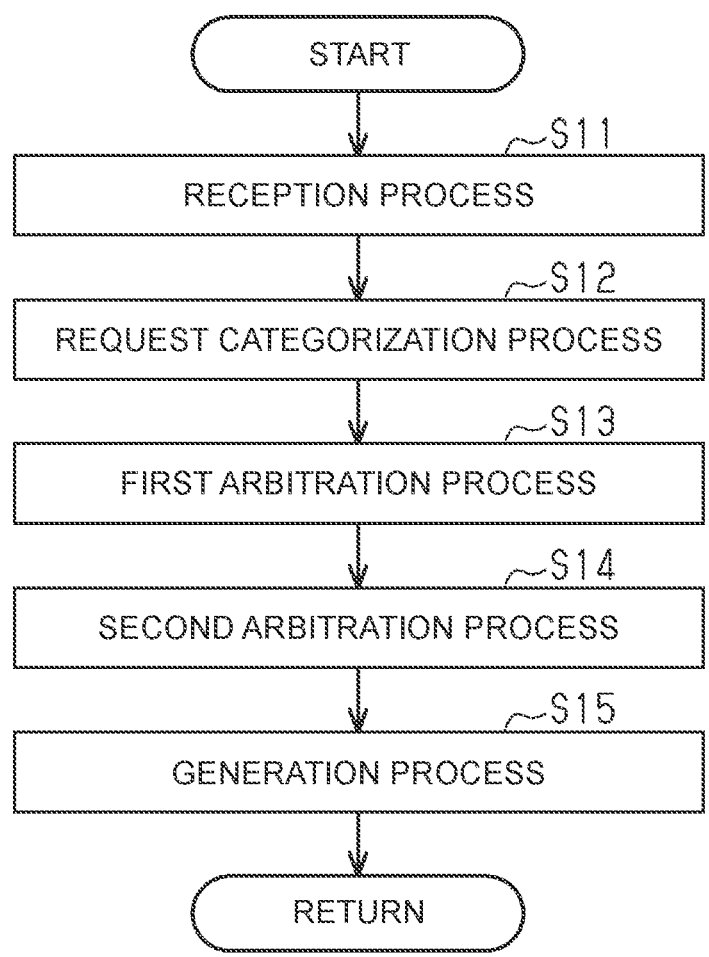
FIG. 3 is a flowchart showing shift arbitration control.
Figure 4:
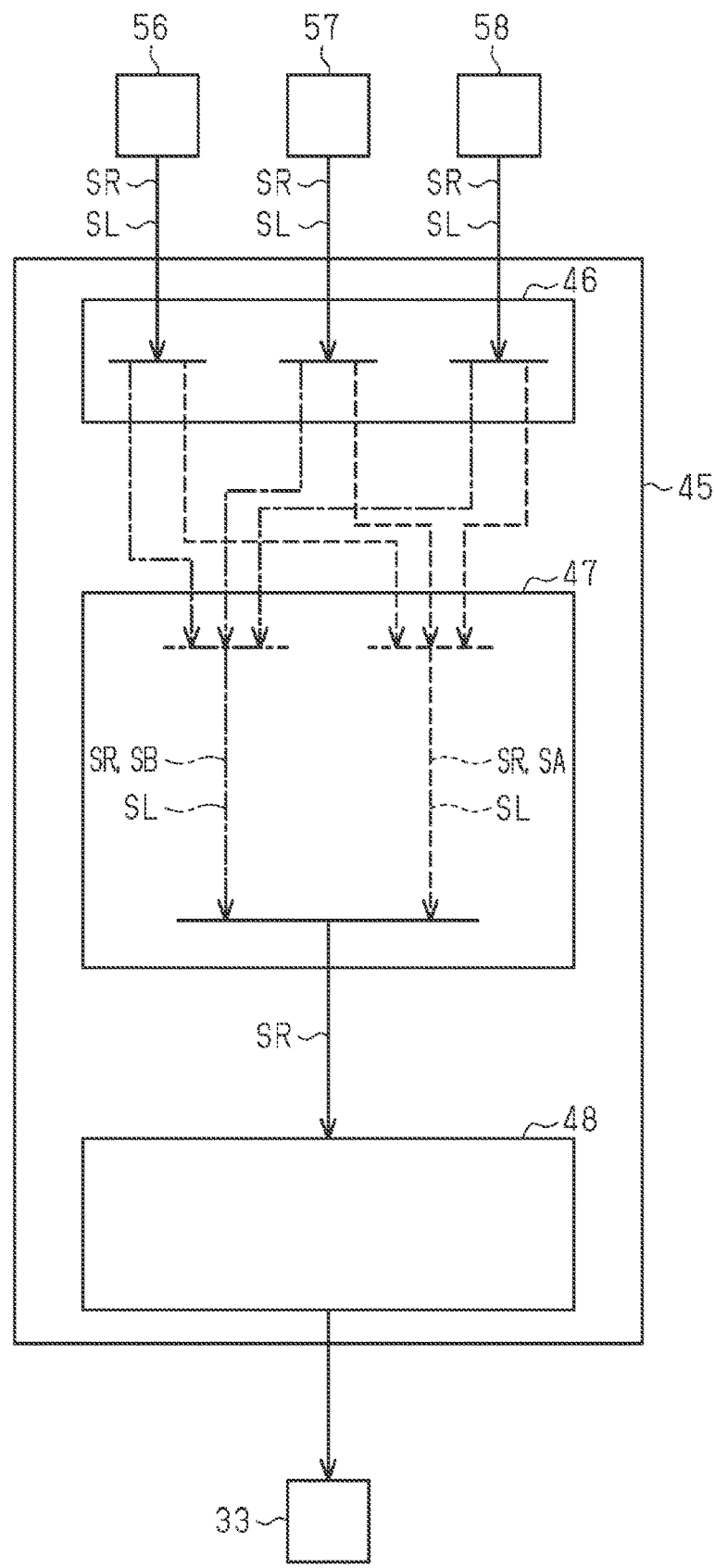
FIG. 4 is a diagram illustrating the shift arbitration control.

When the shift arbitration control is started, as shown in FIG. 3, the motion manager 45 executes a process of step S11. In step S11, the reception unit 46 of the motion manager 45 executes a reception process. Specifically, as shown in FIG. 4, the reception unit 46 receives shift requests SR from the first assistance unit 56, the second assistance unit 57, and the third assistance unit 58. At this time, the reception unit 46 may simultaneously receive a plurality of shift requests SR. When receiving the shift requests SR, the reception unit 46 receives priority levels SL from the first assistance unit 56, the second assistance unit 57, and the third assistance unit 58 in association with the shift requests SR. The priority levels SL are predetermined individually for the first assistance unit 56, the second assistance unit 57, and the third assistance unit 58 that are the sources of the shift requests SR. In other words, the priority levels SL are predetermined individually for the application software products that are the sources of the shift requests SR and implement the driver assistance functions of the vehicle 100. In the present embodiment, the priority levels SL are, for example, determined as follows. First, any one of the first assistance unit 56, the second assistance unit 57, and the third assistance unit 58 with higher reliability in terms of design is identified in consideration of the reliabilities of sensors and data used by the first assistance unit 56, the second assistance unit 57, and the third assistance unit 58 to output the motion requests. For example, the third assistance unit 58, the second assistance unit 57, and the first assistance unit 56 are identified in descending order of reliability. In this case, the priority levels SL associated with the first assistance application 56A, the second assistance application 57A, and the third assistance application 58A can be determined as "1", "2", and "3" in the order of the first assistance application 56A, the second assistance application 57A, and the third assistance application 58A. That is, in the present embodiment, the reliability increases as the numerical value indicating the priority level SL increases. When no shift request SR is received by the reception unit 46 at the time of the process of step S11, the reception unit 46 repeats the process of step S11. When one or more shift requests SR are received by the reception unit 46 at the time of the process of step S11, the reception unit 46 advances the process to step S12 as shown in FIG. 3.

As shown in FIG. 3, the reception unit 46 of the motion manager 45 executes a request categorization process in step S12. Specifically, the reception unit 46 categorizes each of the shift requests SR received in step S11 into a traveling range request SA that is a request in a traveling range or a parking range request SB that is a request in a parking range. The traveling range includes "neutral", "drive", and "reverse" among the shift ranges that can be implemented by the transmission 80. In other words, the traveling range is a shift range in which the driving wheels of the vehicle 100 can rotate. The parking range is "parking" among the shift ranges that can be implemented by the transmission 80. In other words, the parking range is a shift range in which the driving wheels of the vehicle 100 cannot rotate. For example, when the reception unit 46 categorizes the shift request SR as the traveling range request SA, the reception unit 46 outputs the shift request SR to the arbitration unit 47 together with a categorization result as indicated by a dashed arrow in FIG. 4. Further, the reception unit 46 outputs the priority level SL to the arbitration unit 47 in association with the shift request SR. For example, when the reception unit 46 categorizes the shift request SR as the parking range request SB, the reception unit 46 outputs the shift request SR to the arbitration unit 47 together with a categorization result as indicated by a long dashed short dashed arrow in FIG. 4. Further, the reception unit 46 outputs the priority level SL to the arbitration unit 47 in association with the shift request SR. As shown in FIG. 3, the reception unit 46 advances the process to step S13 after step S12.

As shown in FIG. 3, the arbitration unit 47 of the motion manager 45 executes a first arbitration process in step S13. Specifically, as indicated by dashed arrows in FIG. 4, the arbitration unit 47 extracts only the shift requests SR that are continuously received by the reception unit 46 and categorized as the traveling range requests SA. The arbitration unit 47 determines the traveling range request SA received first among the extracted traveling range requests SA as a representative traveling range request SA. Similarly, as indicated by long dashed short dashed arrows in FIG. 4, the arbitration unit 47 extracts only the shift requests SR that are continuously received by the reception unit 46 and categorized as the parking range requests SB. The arbitration unit 47 determines the parking range request SB received first among the extracted parking range requests SB as a representative parking range request SB. Therefore, in the first arbitration process of step S13, the arbitration unit 47 may determine both the representative traveling range request SA and the representative parking range request SB. As shown in FIG. 3, the arbitration unit 47 advances the process to step S14 after step S13.

As shown in FIG. 3, the arbitration unit 47 of the motion manager 45 executes a second arbitration process in step S14. In the second arbitration process, the arbitration unit 47 executes arbitration using, as candidates, the traveling range request SA determined as the representative in the process of step S13 and the parking range request SB determined as the representative in the process of step S13. At this time, the arbitration unit 47 uses, as conditions, the priority levels SL associated with the traveling range request SA and the parking range request SB determined as the representatives, and whether the shift request SR is the traveling range request SA or the parking range request SB.

Specifically, when there is a traveling range request SA determined as a representative but there is no parking range request SB determined as a representative in the first arbitration process of step S13, the arbitration unit 47 selects the traveling range request SA as a result of arbitration of the shift requests SR. When there is no candidate for the traveling range request SA determined as a representative but there is a parking range request SB determined as a representative in the first arbitration process of step S13, the arbitration unit 47 selects the parking range request SB as a result of arbitration of the shift requests SR. When only one of the representative traveling range request SA and the representative parking range request SB is present in this way, the arbitration unit 47 selects the present shift request SR regardless of the priority level SL.

It is assumed that both the traveling range request SA determined as a representative and the parking range request SB determined as a representative are present in the first arbitration process of step S13. When the priority levels SL associated with the traveling range request SA and the parking range request SB determined as the representatives are different from each other, the arbitration unit 47 selects the shift request SR having a higher priority level SL as a result of arbitration of the shift requests SR. It is assumed that both the traveling range request SA determined as a representative and the parking range request SB determined as a representative are present. When the priority levels SL associated with the traveling range request SA and the parking range request SB determined as the representatives are the same, the arbitration unit 47 selects the parking range request SB as a result of arbitration of the shift requests SR. Then, the arbitration unit 47 outputs the arbitration result to the generation unit 48 as indicated by a continuous arrow in FIG. 4. As shown in FIG. 3, the arbitration unit 47 advances the process to step S15 after step S14.

As shown in FIG. 3, the generation unit 48 of the motion manager 45 executes a generation process in step S15. Specifically, the generation unit 48 generates an instruction value for an action request to control the transmission 80 based on the arbitration result in the process of step S14. As indicated by a continuous arrow in FIG. 4, the motion manager 45 outputs the instruction value for the action request to the transmission control unit 33. As shown in FIG. 3, the generation unit 48 terminates the current shift arbitration control after step S15. Then, the generation unit 48 advances the process to step S11 again.

Operations of Embodiment

It is assumed that the reception unit 46 of the motion manager 45 receives a traveling range request SA as the shift request SR from the second assistance unit 57 among the first assistance unit 56, the second assistance unit 57, and the third assistance unit 58 at a first timing serving as a certain timing onward. In this case, the arbitration unit 47 of the motion manager 45 selects the traveling range request SA as a result of arbitration of the shift requests SR at the first timing. Then, the generation unit 48 of the motion manager 45 generates an instruction value for an action request to control the transmission 80 based on the traveling range request SA that is the arbitration result.

It is assumed that, at a second timing after the first timing, the reception unit 46 of the motion manager 45 continues to receive the traveling range request SA as the shift request SR from the second assistance unit 57 and receives a parking range request SB as the shift request SR from the third assistance unit 58. In this case, the arbitration unit 47 of the motion manager 45 determines the traveling range request SA received from the second assistance unit 57 as a representative traveling range request SA at the second timing. The arbitration unit 47 of the motion manager 45 determines the parking range request SB received from the third assistance unit 58 as a representative parking range request SB. The arbitration unit 47 of the motion manager 45 selects, as a result of arbitration of the shift requests SR, one of the traveling range request SA determined as the representative and the parking range request SB determined as the representative. Specifically, the shift requests SR are arbitrated by using, as conditions, the priority levels SL associated with the traveling range request SA and the parking range request SB determined as the representatives, and whether the shift request SR is the traveling range request SA or the parking range request SB. For example, it is assumed that the priority level SL associated with the traveling range request SA determined as the representative from the second assistance unit 57 is "2" and the priority level SL associated with the parking range request SB determined as the representative from the third assistance unit 58 is "3". In this case, the arbitration unit 47 of the motion manager 45 selects the parking range request SB received from the third assistance unit 58 and having the higher priority level SL as the result of arbitration of the shift requests SR. Then, the generation unit 48 of the motion manager 45 generates an instruction value for an action request to control the transmission 80 based on the parking range request SB that is the arbitration result.

Effects of Embodiment

In the present embodiment described above, for example, when the traveling range request SA is received first as the shift request SR and the parking range request SB is received as the shift request SR afterward, the parking range request SB may be selected as an arbitration result. Therefore, in the present embodiment, it is possible to fulfill the shift request SR having priority when a plurality of shift requests SR is received.

For example, the reliabilities of the motion requests of the first assistance unit 56, the second assistance unit 57, and the third assistance unit 58 change depending on the reliabilities of the sensors and data used by the first assistance unit 56, the second assistance unit 57, and the third assistance unit 58 to output the motion requests. When the motion request having a higher reliability is fulfilled, there is a stronger possibility of motion desirable for the vehicle 100. Therefore, it may be desirable to arbitrate the shift requests SR received by the reception unit 46 from the first assistance unit 56, the second assistance unit 57, and the third assistance unit 58 in order of priority associated with the reliability of the motion request.

In this regard, when receiving the shift requests SR, the reception unit 46 receives the priority levels SL from the first assistance unit 56, the second assistance unit 57, and the third assistance unit 58 in association with the shift requests SR. The arbitration unit 47 arbitrates the shift requests SR by using, as conditions, the priority levels SL associated with the traveling range request SA and the parking range request SB determined as the representatives. Thus, the shift requests SR are arbitrated in consideration of the priority levels SL of the first assistance unit 56, the second assistance unit 57, and the third assistance unit 58. As a result, it is possible to increase the possibility of selection of an appropriate shift request SR as the arbitration result depending on the status of the vehicle 100 compared to, for example, a case where the shift requests SR are arbitrated by simply using, as a condition, whether the shift request SR is the traveling range request SA or the parking range request SB.

In the present embodiment, when the priority levels SL associated with the traveling range request SA and the parking range request SB determined as the representatives are the same, the arbitration unit 47 selects the parking range request SB as a result of arbitration of the shift requests SR. In general, the vehicle 100 is safer in a situation where the vehicle 100 is parked than in a situation where the vehicle 100 is traveling. According to the present embodiment, when the priority levels SL associated with the traveling range request SA and the parking range request SB determined as the representatives are the same, the parking range request SB with higher safety for the vehicle 100 can be selected as the arbitration result.

It is assumed that the reception unit 46 of the motion manager 45 receives a traveling range request SA as the shift request SR from the second assistance unit 57 among the first assistance unit 56, the second assistance unit 57, and the third assistance unit 58 at a third timing serving as a certain timing onward. It is assumed that, at a fourth timing after the third timing, the reception unit 46 of the motion manager 45 continues to receive the traveling range request SA as the shift request SR from the second assistance unit 57 and receives a traveling range request SA as the shift request SR from the third assistance unit 58. The traveling range includes "neutral", "drive", and "reverse" among the shift ranges that can be implemented by the transmission 80. Therefore, if the traveling range request SA received from the third assistance unit 58 at the fourth timing is determined as a representative traveling range request SA, the actual shift range of the transmission 80 may change.

In this regard, in the present embodiment, the arbitration unit 47 determines, as the representative traveling range request SA, the traveling range request SA received first among the traveling range requests SA that are continuously received by the reception unit 46. Therefore, even in the situation where the reception unit 46 receives a plurality of traveling range requests SA at the fourth timing, priority is given to the traveling range request SA received first from the second assistance unit 57. Thus, at the fourth timing, the traveling range request SA made before the fourth timing is continued. Accordingly, it is possible to suppress unnecessary change of the actual shift range of the transmission 80.

MODIFICATIONS

The present embodiment can be modified as follows. The present embodiment and the following modifications may be combined as long as no technical contradiction arises.

In the above embodiment, the shift arbitration control may be changed. For example, in step S13, the arbitration unit 47 need not determine, as the representative traveling range request SA, the traveling range request SA received first among the traveling range requests SA that are continuously received by the reception unit 46. As a specific example, in step S13, the arbitration unit 47 of the motion manager 45 may determine the representative traveling range request SA among the traveling range requests SA that are continuously received by the reception unit 46 based on the priority levels SL associated with the traveling range requests SA. For example, it is assumed that the reception unit 46 of the motion manager 45 continues to receive the traveling range request SA as the shift request SR from the second assistance unit 57 and receives a traveling range request SA as the shift request SR from the third assistance unit 58 afterward. It is assumed that the priority level SL associated with the traveling range request SA from the second assistance unit 57 is "2" and the priority level SL associated with the traveling range request SA from the third assistance unit 58 is "3". In this case, the arbitration unit 47 of the motion manager 45 may determine, as the representative traveling range request SA, the traveling range request SA received from the third assistance unit 58 and having the higher priority level SL among the traveling range requests SA that are continuously received by the reception unit 46.

Similarly to the above, in the first arbitration process of step S13, the arbitration unit 47 need not determine, as the representative parking range request SB, the parking range request SB received first among the parking range requests SB that are continuously received by the reception unit 46. As a specific example, in step S13, the arbitration unit 47 of the motion manager 45 may determine the representative parking range request SB among the parking range requests SB that are continuously received by the reception unit 46 based on the priority levels SL associated with the parking range requests SB.

For example, in step S14, when the priority levels SL associated with the traveling range request SA and the parking range request SB determined as the representatives are the same, the arbitration unit 47 may select the traveling range request SA as a result of arbitration of the shift requests SR.

For example, in step S14, the arbitration unit 47 may arbitrate the shift requests SR regardless of the priority levels SL. As a specific example, it is assumed in step S14 that both the traveling range request SA and the parking range request SB determined as the representatives in the process of step S13 are present. In this case, the arbitration unit 47 may select a predetermined one of the shift requests SR as the result of arbitration of the shift requests SR regardless of the priority levels SL. In this configuration, it is preferable that the arbitration unit 47 select the parking range request SB as the result of arbitration of the shift requests SR. In this configuration, when receiving the shift requests SR in step S11, the reception unit 46 need not receive the priority levels SL associated with the shift requests SR from the first assistance unit 56, the second assistance unit 57, and the third assistance unit 58.

In the above embodiment, the configuration of the vehicle 100 may be changed. For example, the configuration related to the priority levels SL may be changed. As a specific example, the values of the priority levels SL may be set regardless of the reliabilities of the sensors and data used by the first assistance unit 56, the second assistance unit 57, and the third assistance unit 58 to output the motion requests.

For example, the storage device 52 of the advanced driver assistance ECU 50 may store application software products that implement driver assistance functions of two, four, or more vehicles 100. In this configuration, the reception unit 46 may receive two, four, or more shift requests SR.

For example, the information processing device may be a component other than the brake ECU 40. As a specific example, the CPU 11 of the central ECU 10 instead of the brake ECU 40 may implement the function of the motion manager 45 by executing the motion manager application 45A stored in the storage device 12. In this case, the central ECU 10 serves as the information processing device. That is, the central ECU 10, the engine ECU 20, the transmission ECU 30, the brake ECU 40, and the advanced driver assistance ECU 50 may function as the information processing device.

What is claimed is:

1. An information processing device comprising a processor configured to:
   receive shift requests to control a shift range of a vehicle from a plurality of application software products configured to implement driver assistance functions of the vehicle;
   arbitrate the shift requests by using, as a condition, whether each of the received shift requests is a request in a traveling range or a request in a parking range when the traveling range is the shift range in which a driving wheel of the vehicle is rotatable and the parking range is the shift range in which the driving wheel is not rotatable; and
   generate an instruction value for an action request to drive an actuator based on a result of arbitration.

2. The information processing device according to claim 1, wherein:
   the processor is configured to receive priority levels in association with the shift requests when receiving the shift requests;
   the priority levels is determined individually for the application software products that are sources of the shift requests; and
   the processor is configured to arbitrate the shift requests by using, as a condition, the priority levels associated with the received shift requests, and whether each of the received shift requests is the request in the traveling range or the request in the parking range.

3. The information processing device according to claim 2, wherein the processor is configured to select the request in the parking range as a result of arbitration of the shift requests when the priority level associated with the received request in the traveling range and the priority level associated with the received request in the parking range are the same.

4. The information processing device according to claim 1, wherein:
   the processor is configured to determine, as a representative of the request in the traveling range, a request in the traveling range that is received first among requests in the traveling range that are received continuously; and
   the processor is configured to arbitrate the shift requests by using, as a candidate, the request in the traveling range that is determined as the representative.

5. A non-transitory storage medium storing instructions that are executable by one or more processors of an information processing device and that cause the one or more processors to perform functions comprising:
   receiving shift requests to control a shift range of a vehicle from a plurality of application software products configured to implement driver assistance functions of the vehicle;
   arbitrating the shift requests by using, as a condition, whether each of the received shift requests is a request in a traveling range or a request in a parking range when the traveling range is the shift range in which a driving wheel of the vehicle is rotatable, and the parking range is the shift range in which the driving wheel is not rotatable; and
   generating an instruction value for an action request to drive an actuator based on a result of arbitration.

6. An information processing method to be executed by an information processing device, the information processing method comprising:
   receiving shift requests to control a shift range of a vehicle from a plurality of application software products configured to implement driver assistance functions of the vehicle;
   arbitrating the shift requests by using, as a condition, whether each of the received shift requests is a request in a traveling range or a request in a parking range when the traveling range is the shift range in which a driving wheel of the vehicle is rotatable, and the parking range is the shift range in which the driving wheel is not rotatable; and
   generating an instruction value for an action request to drive an actuator based on a result of arbitration.

\* \* \* \* \*